United States Patent [19]

Low et al.

[11] 3,710,261

[45] Jan. 9, 1973

[54] DATA-AIDED CARRIER TRACKING LOOPS

[76] Inventors: George M. Low, Acting Administrator of the National Aeronautics and Space Administration with respect to an invention of; William C. Lindsey; Marvin K. Simon, both of Pasadena, Calif.

[22] Filed: Dec. 24, 1970

[21] Appl. No.: 101,354

[52] U.S. Cl. ....................325/346, 325/419

[51] Int. Cl. ....................H04b 1/26

[58] Field of Search ........325/45, 47, 48, 60, 63, 345, 325/346, 348, 418, 419, 422; 179/15 AN, 15 FD; 343/205, 206

[56] References Cited

UNITED STATES PATENTS

| | | | |
|---|---|---|---|
| 3,204,185 | 8/1965 | Robinson | 325/346 X |
| 3,391,339 | 7/1968 | Lynch | 325/60 |
| 3,518,680 | 6/1970 | McAuliffe | 179/15 AN |

*Primary Examiner*—Benedict V. Safourek

*Attorney*—Monte F. Mott, Paul F. McCaul and John R. Manning

[57] ABSTRACT

The loop signal-to-noise ratio is improved in a phase-locked loop used for tracking a carrier in an angle (phase or frequency) modulated communications system by a quadrature channel added to the phase-locked loop. A d-c signal derived from the quadrature channel is added to the signal fed back to the voltage controlled oscillator in the otherwise conventional phase-locked loop.

6 Claims, 2 Drawing Figures

*INVENTORS.*
WILLIAM C. LINDSEY
MARVIN K. SIMON
*BY*
ATTORNEYS.

DATA-AIDED CARRIER TRACKING LOOPS

ORIGIN OF INVENTION

The invention described herein was made in the performance of work under a NASA contract and is subject to the provisions of section 305 of the National Aeronautics and Space Act of 1958, Public Law 85–568 (72 Stat. 435; 42 USC 2457).

BACKGROUND OF THE INVENTION

This invention relates to phase-locked loops for tracking carrier signals which have been angle (phase or frequency) modulated, and more particularly to an improvement for enhancing the loop signal-to-noise ratio in such phase-locked loops.

In conventional phase-locked loops used to track a carrier in a communications receiver, only the power in the carrier has been used for purposes of establishing a coherent reference signal. This is because ordinarily the modulated subcarrier component of power is filtered out by the carrier tracking loop filter. It would be very desirable to use that component of power as well as power in the carrier to establish a coherent reference signal.

SUMMARY OF THE INVENTION

Briefly, the loop signal-to-noise ratio is improved in a phase-locked loop having a multiplier, a loop filter, and a voltage controlled oscillator (VCO) by including a quadrature channel which adds to the VCO control signal from the filter a second control signal derived from the power in the input signal sidebands. For a single channel system, where the input signal consists of a carrier modulated by an intelligence (e.g. data or sync), the quadrature channel comprises means for phase shifting the VCO output by 90°, means for multiplying the input signal to the phase-locked loop with the phase-shifted VCO output, means for delaying the resulting product signal by a time delay equal to the reciprocal of the intelligence rate, and means for multiplying the delayed product signal by a signal representing the product $\hat{d}(t)\ \hat{S}(t)$, where $\hat{d}(t)$ is a signal representing an estimate of the data produced by a data demodulator, and $\hat{S}(t)$ is an estimate of the data produced by a subcarrier demodulator. The output of the last multiplying means is coupled by a loop filter to a summing means for adding the second control signal to the normal VCO control signal.

For a multi-channel system, where a carrier is modulated by a number of intelligence modulated subcarriers, a multi-dimensional extension of the present invention can be employed to produce a "second" control signal to be added to the VCO control signal for each channel, and/or for each possible pair of channels to receiver power from all possible cross-modulation components, and/or for each possible groups of three channels, and so forth. In each case of two or more channels grouped together, a delay element is employed in each channel selected to align the phases of signals being multiplied, and a delay element is employed to align the phase of the product with the input signal. For example, in a two channel system, the product $\hat{d}_1(t)\ \hat{S}_1(t)$ is delayed by an element $D_1$ while the product $\hat{d}_2(t)\ \hat{S}_2(t)$ is delayed by an element $D_2$ in order that these two products be in phase when multiplied together to form a third product. That third product is multiplied by the input signal delayed by an element $D_3$, where the delay period $T_3$ of the element $D_3$ is equal to the least common multiple of $T_1$ and $T_2$, the reciprocals of the intelligence rates in the two channels, and the delay periods of the elements $D_1$ and $D_2$ are equal to $T_3-T_1$ and $T_3-T_2$, respectively.

The novel features that are considered characteristic of the invention are set forth with particularity in the appended claims. The invention will best be understood from the following description when read in connection with the accompanying drawings.

DESCRIPTION OF THE PREFERRED EMBODIMENTS

Figure 1:
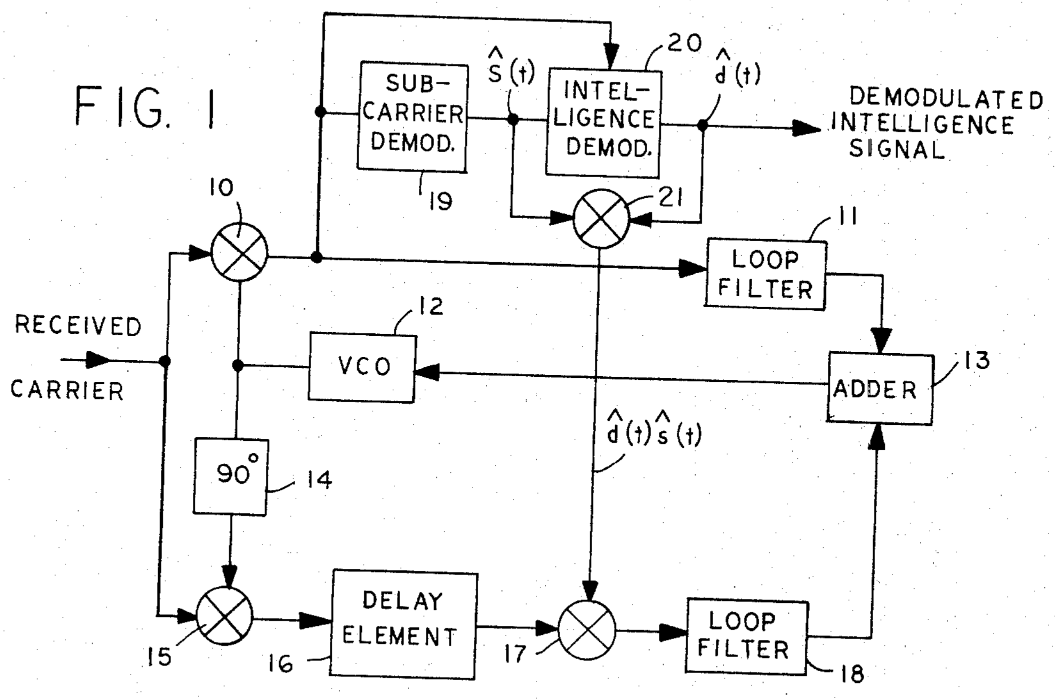
FIG. 1 is a schematic diagram of the present invention for use in a single channel communications system.

Referring now to FIG. 1 a phase-locked loop is shown consisting of a multiplier 10, such as a double-balanced diode mixer, a loop (time invariant linear) filter 11 and a voltage controlled oscillator (VCO) 12. This standard phase-locked loop is improved in accordance with the present invention by adding a second signal to the VCO control signal through an adder 13, such as an analog summing amplifier. The second signal is a d-c component of the VCO control signal that is proportional to the power in the modulated subcarrier in order that the power in the composite signal sidebands be used to enhance the signal-to-noise ratio in the carrier tracking loop.

The second control signal is developed in a quadrature channel consisting of a 90° phase shifter 14, a second multiplier 15, a delay element 16, a third multiplier 17 and a loop filter 18 which is of a type having the same characteristics as the standard loop filter 11, and can be identical to it, although for optimum results, a separate design may be desired in some cases. The delay period of the element is selected to be the reciprocal of the data rate in order to align the output of the multiplier with a signal that represents an estimate of the modulated subcarrier produced by multiplying the output signal of a subcarrier demodulator 20 in a multiplier 21. Thus the estimate is the product $\hat{d}(t)\ \hat{S}(t)$ where $\hat{d}(t)$ is the estimate of output data from the data demodulator and $\hat{S}(t)$ is the estimate of the reference subcarrier from the subcarrier demodulator.

The received signal is typically a Doppler-shifted, phase-shifted, noise-corrupted waveform of the following form:

$$\psi(t) = \sqrt{2P_1}\sin[\omega_1 t + (\cos^{-1}m_1)x_1(t) + (\cos^{-1}m_2)x_2(t) + \theta_1] + n_1(t). \quad (1)$$

where: $x_1(t)$ is the modulated subcarrier No. 1; $x_2(t)$ is modulated subcarrier No. 2; $\cos^{-1}m_1$ and $\cos^{-1}m_2$ are weighted constants which allocate the proper amount of available sideband power to each signal; and $P_1$ is the total average radiated power. After transmission, the channel introduces an arbitrary (but unknown) phase shift $\theta_1$ in the transmitted waveform and further disturbs it with additive white Gaussian noise $n_1(t)$ of single-sided spectral density $N_{01}$W/Hz. The additive noise process $n_1(t)$ may be represented by $$n_1(t) = \sqrt{2}[n_{1c}(t)\cos(\omega_1 t+\theta_1)+n_{1s}(t)\sin(\omega_1 t+\theta_1)] \quad (2)$$

where $n_{1c}(t)$ and $n_{1s}(t)$ are statistically independent white Gaussian noise processes of single-sided spectral density $N_{01}$W/Hz. It is further assumed that the spectrum of processes $n_{1c}(t)$ and $n_{1s}(t)$ covers a bandwidth which is wide when compared with a bandwidth of the transmitted signal. Using a simple trigonometric expansion, and using the relationship $x_1(t) = \pm 1$ and $x_2(t) = \pm 1$, Equation (1) may be written as follows:

$$\psi(t) = \underbrace{\sqrt{2m_1^2m_2^2P_1}\sin(\omega_1 t+\theta_1)}_{\text{carrier component}} + \quad (3)$$

$$\sqrt{2m_2^2(1-m_1^2)P_1}\underbrace{x_1(t)\cos(\omega_1 t+\theta_1)}_{\text{subcarrier component No. 1}} +$$

$$\sqrt{2m_1^2(1-m_2^2)P_1}\underbrace{x_2(t)\cos(\omega_1 t+\theta_1)}_{\text{subcarrier component No. 2}} -$$

$$\sqrt{2(1-m_1^2)(1-m_2^2)P_1}\underbrace{x_1(t)x_2(t)\sin(\omega_1+\theta_1)}_{\text{cross-modulation loss component}} + n_1(\text{A}Dt)$$

The carrier component is a sine function while the two subcarrier components are cosine functions. Accordingly, the reference signal from the VCO must be phase shifted 90° in order to develop for the second and third control signals a d-c component that is proportional to the powers in the particular (respective) modulated subcarriers and in phase with the VCO control signal from the conventional part of the phase-locked loop. When added to the VCO control signal, that d-c component effectively increases the amplitude of the loop phase detector (characteristic without altering its shape) in proportion to the power in the signal's sidebands, thereby providing greatly improved signal tracking capability. In that manner, a signal representing the product $\hat{d}(t)\ \hat{S}(t)$ is formed as an estimate of the modulated subcarrier which when fed into the carrier tracking loop is effectively used to recover the power in the sideband components for carrier tracking purposes. Ordinarily, this component of power is lost because it is filtered out by the carrier-tracking loop filter 11.

The amplitude of the loop phase-detector characteristic is also increased in proportion to the phase jitter in the subcarrier tracking loop, and the conditional probability of error of the data demodulator. The latter depends upon both the subcarrier and RF phase errors, so that the exact solution to the problem involves a two-dimensional iteration. However, cursory examination of subcarrier and phase errors indicates that degradations attributable to them are small relative to that caused by the carrier tracking loop error. Therefore, essentially all of the sideband power can be recovered and used to improve the carrier tracking loop. As an example, assuming equal first order loop filters and zero detuning, the loop signal-to-noise ratio improvement realized in the above data-aided tracking loop relative to that of the standard phase-locked loop is bounded from above by $I = (1+GM)^2/(1+{}^2)$. In the above, $G = K_L/K_U$ is the ratio of the open loop gain in the lower half of the loop to that in the upper half, and $M = \sqrt{(1-m^2)/m^2}$ where $m$ is the modulation factor. For a fixed $m$, the optimum value of $G$ (in the sense of maximizing $I$) is given by $G_{opt} = M$. The current state of the art demands that $m^2 \geq 0.1$ and hence the maximum improvement in loop signal-to-noise ratio performance for one-way tracking systems is, under the above assumptions, $I$=10(or 10db).

In communication systems having a plurality of intelligence modulated subcarriers, a separate quadrature loop may be added for each such modulated subcarrier in parallel with the one shown in FIG. 1, such that each quadrature loop functions independently, but cooperates with all others through the contribution its output makes to the VCO control signal upon being added to the output signal of the filter 11. In addition, crops-modulation losses between all possible pairs of subcarrier channels can be recovered and used for carrier tracking purposes.

The recovery of cross-modulation losses using the technique of the present invention is illustrated for two subcarrier channels. To facilitate understanding this extension of the present invention, elements common to FIG. 1 are identified by the same reference numerals. However, as will be explained more fully, the period of delay to be introduced by the element 16' is different, as signified by the prime.

A separate subcarrier demodulator (SCD) and data demodulator (DDM) is provided for each subcarrier channel. An SCD 22 and a DDM 23 for the first channel provide an estimate of the modulated subcarrier $\hat{d}_1(t)\ \hat{S}_1(t)$ through a multiplier 24. An SCD 25 and a DDM 26 similarly provide an estimate of the modulated subcarrier $\hat{d}_2(t)\ \hat{S}_2(t)$ for the second channel through a multiplier 27. The two terms are then combined after suitable delays by a multiplier 28 to form an estimate of the cross-modulation $\hat{d}_1(t)\hat{d}_2(t)\hat{S}(t)\hat{S}(t)$.

In order to form the estimate of the cross-modulation, the channel output terms being combined must be delayed by particular delay times in order for their phases to be properly aligned. To determine the delay times for elements 29 and 30 which accomplish that, the delay element 16' is selected to have a delay $T_3$ which is the least common multiple of the reciprocals of the data rates in the two channels. The delays $D_1$ and $D_2$ for the elements 29 and 30 are then selected to be $T_3-T_1$ and $T_3-T_2$, respectively, where $T_1$ and $T_2$ are the reciprocals of the respective first and second data channels rates. That assures that the cross-modulation signal to the multiplier 17 is in phase with the signal from the delay element 16'.

Figure 2:
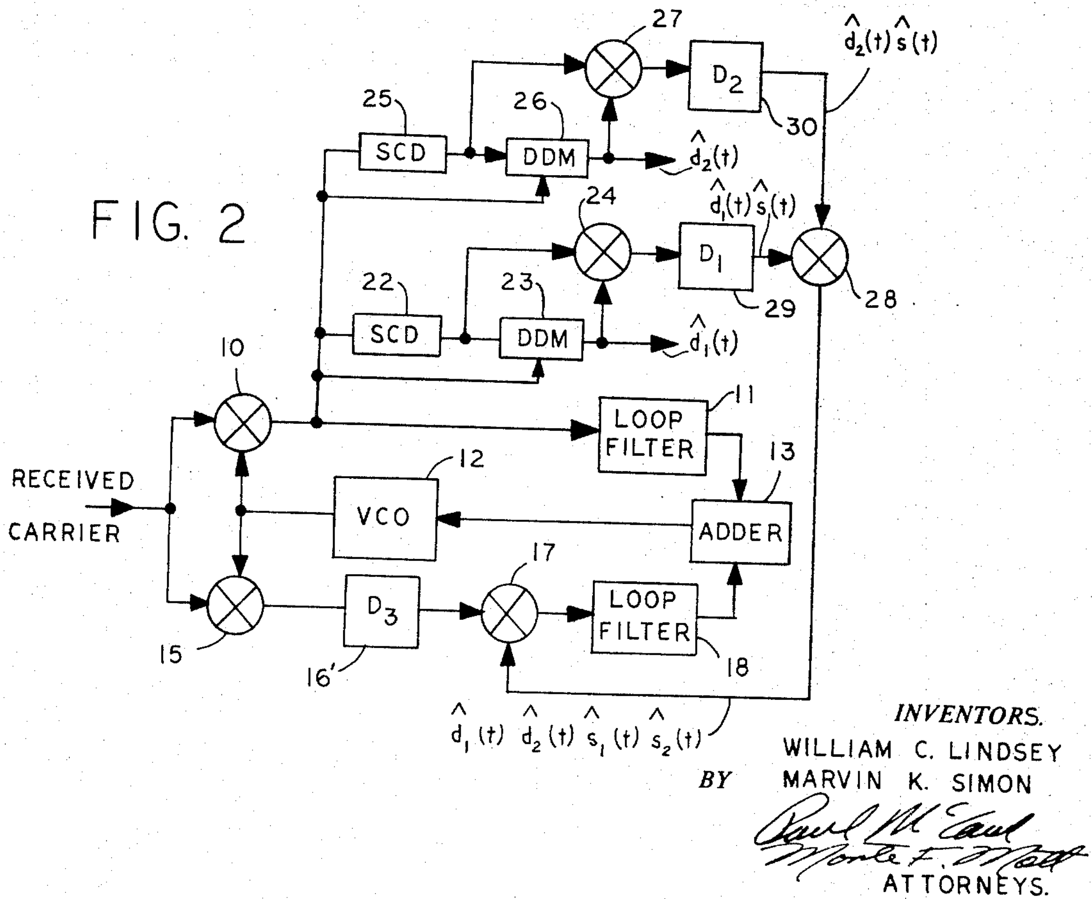
FIG. 2 is a schematic diagram of the present invention illustrating an extension of the present invention for use in a communications system having two channels.

For a multiple channel system, a composite of the techniques of FIGS. 1 and 2 may be employed to recover not only the subcarrier power of individual modulated subcarrier channels but also of all possible cross-modulation signals taken in groups of two, three, and so forth, up to the one possible cross-modulation signal of all taken together as one group. However, as most communications system will have only one or two channels, either the technique as applied in FIG. 1 or FIG. 2 will suffice, and in the case of two channels, the technique as applied in FIG. 1 for each of the two channels can be added to the technique for the cross-modulation component as applied in FIG. 2. The adder 13 would then be provided with two additional inputs to form the VCO control signal.

It should be noted that in the application of the technique of the present invention to recovery of cross-modulation power, a phase shifter is not employed as in the application of the technique to recovery of power from individual modulated subcarrier channels. The reason is apparent from Equation (3). The cross-modulation component of the input signal is a sine function, and not a cosine function as for subcarrier components No. 1 and No. 2. Therefore, the reference signal need not be shifted 90° to form a cosine product to be multiplied by a cosine product from the multiplier 28.

Although particular embodiments of the invention have been described and illustrated herein, it is recognized that modifications and variations may readily occur to those skilled in the art and consequently it is intended to cover such modifications and equivalents.

What is claimed is:

1. In a phase-locked loop having a conventional d-c control signal fed back to a voltage controlled oscillator for tracking a carrier signal applied to said loop in an angle modulated communications system having said carrier signal modulated by at least one intelligence modulated subcarrier, the improvement comprising:

means for phase-shifting the a-c output of said oscillator;

means for multiplying said carrier signal by the output signal of said phase-shifting means to produce a product signal;

means for delaying said product signal by a delay time equal to the reciprocal of the intelligence rate in one subcarrier modulated onto said carrier signal to provide a delayed product signal;

means for forming a signal representing an estimate of said modulated subcarrier power as the product of demodulated subcarrier and demodulated intelligence;

means for multiplying said delayed product signal by said power estimate signal to produce a final product signal;

means for filtering said final product signal to produce a d-c component signal proportional to the power of said modulated subcarrier; and means for adding said d-c component signal to said control signal fed back to said voltage controlled oscillator.

2. The improvement defined by claim 1 wherein said means for forming said signal representing an estimate of said modulated subcarrier power comprises:

means for demodulating said carrier signal to obtain a first signal representing an estimate of said subcarrier modulated onto said carrier;

means for demodulating said subcarrier signal to obtain a second signal representing an estimate of said intelligence modulated onto said subcarrier; and means for multiplying together said first and second signals.

3. In a phase-locked loop having a conventional d-c control signal fed back to a voltage controlled oscillator for tracking a carrier signal applied to said loop in an angle modulated communications system having said carrier signal modulated by a plurality of intelligence modulated subcarriers, the improvement comprising:

means for multiplying said carrier signal by the output signal of said oscillator to produce a carrier product signal;

means for forming a power estimate signal representing an estimate of the power of said intelligence modulated subcarriers as the combined product of demodulated subcarriers and demodulated intelligence signals, said estimate forming means including means for aligning the phases of demodulated subcarriers and demodulated intelligence signals;

means for delaying said carrier product signal by a period sufficient to align said carrier product signal with said power estimate signal;

means for multiplying said delayed carrier product signal by said power estimate signal to produce a final product signal;

means for filtering said final product signal to produce said d-c component signal proportional to the power of said modulated subcarriers; and means for adding said d-c component signal to said control signal fed back to said voltage controlled oscillator.

4. The combination of claim 3 wherein said means for forming said power estimate signal comprises:

means for separately demodulating said intelligence modulated subcarriers to obtain signals representing estimates of said subcarriers modulated onto said carrier;

means for separately demodulating said subcarriers to obtain signals representing estimates of said intelligence signals modulated onto said subcarriers;

means for multiplying said estimate signal of each subcarrier by said estimate signal of its intelligence signal to obtain product signals;

a plurality of delay means for delaying each product signal by a period equal to the intelligence rate of its intelligence signal; and means for multiplying together the output signals of said plurality of delay means.

5. In a phase-locked loop having a control signal fed back to a voltage controlled oscillator for tracking a carrier signal applied to said loop in an angle modulated communications system having said carrier signal modulated by at least two intelligence signal modulated subcarriers, a quadrature channel added to said phase-locked loop, comprising:

means for multiplying said carrier signal by the output signal of said oscillator to produce a carrier product signal;

means for forming a power estimate signal representing an estimate of the power of said two intelligence modulated subcarriers as the combined product of demodulated subcarriers and demodulated intelligence signals, said estimate forming means including means for aligning the phases of demodulated subcarriers and demodulated intelligence signals;

means for delaying said carrier product signal by a period sufficient to align said carrier product signal with said power estimate signal;

means for multiplying said delayed carrier product signal by said power estimate signal to produce a final product signal;

means for filtering said final product signal to produce a d-c signal proportional to the power of said modulated subcarriers; and means for adding said d-c signal to said control signal fed back to said oscillator.

6. The combination of claim 5 wherein said means for forming said power estimate signal comprises:

means for separately demodulating said two intelligence modulated subcarriers to obtain an estimate of said two subcarriers modulated on said carrier;

means for separately demodulating said two subcarriers to obtain an estimate of said intelligence signals modulated on said two subcarriers;

means for multiplying the estimate of each subcarrier by the estimate of its intelligence signal to obtain first and second products;

first delay means for delaying said first product by a period equal to the intelligence rate of its intelligence signal;

second delay means for delaying said second product by a period equal to the intelligence rate of its intelligence signal; and means for multiplying the output signals of said first delay means and said second delay means.

* * * * *